(12) United States Patent
Takeuchi

(10) Patent No.: US 7,209,428 B2
(45) Date of Patent: Apr. 24, 2007

(54) OPTICAL SYSTEM OF OPTICAL PICK-UP

(75) Inventor: Shuichi Takeuchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 522 days.

(21) Appl. No.: 10/861,490

(22) Filed: Jun. 7, 2004

(65) Prior Publication Data

US 2004/0246872 A1     Dec. 9, 2004

(30) Foreign Application Priority Data

Jun. 5, 2003     (JP)     ............... 2003-160565

(51) Int. Cl.
*G11B 7/00* (2006.01)
(52) U.S. Cl. .............. 369/112.23; 369/112.05
(58) Field of Classification Search ............ 369/112.23
See application file for complete search history.

(56) References Cited

U.S. PATENT DOCUMENTS

| | | | |
|---|---|---|---|
| 5,002,374 A | | 3/1991 | Ishibai et al. |
| 5,966,362 A | * | 10/1999 | Arai et al. ............. 369/112.23 |
| 6,473,387 B1 | | 10/2002 | Maruyama et al. |
| 6,665,130 B2 | * | 12/2003 | Kimura ....................... 359/719 |
| 6,819,504 B2 | * | 11/2004 | Maruyama ................... 359/719 |
| 6,950,383 B2 | * | 9/2005 | Kimura ................. 369/112.02 |

| | | | |
|---|---|---|---|
| 2002/0097661 A1 | * | 7/2002 | Itonaga et al. ......... 369/112.23 |

FOREIGN PATENT DOCUMENTS

| | | |
|---|---|---|
| JP | 64-25113 | 1/1989 |
| JP | 2-223906 | 9/1990 |
| JP | 8-62496 | 3/1996 |
| JP | 8-334686 | 12/1996 |

OTHER PUBLICATIONS

English Language Abstract of JP 8-62496.
English Language Abstract of JP 8-334686.

* cited by examiner

*Primary Examiner*—Thang V. Tran
*Assistant Examiner*—Van T. Pham
(74) *Attorney, Agent, or Firm*—Greenblum & Bernstein, P.L.C.

(57) ABSTRACT

An optical system of an optical pick-up, which is provided with a light source that emits a light beam, and an objective lens that converges the light beam emitted by the light source onto a data recording layer of an optical disc. The optical system satisfies a condition: $0.75 < d \cdot (M-1)/(M \cdot L) < 1.0$, where d (mm) represents a thickness of the objective lens, M represents magnification of the optical system, and L (mm) represents an O/I distance which is defined as a distance between an object and an image. A beam spot suitable for the optical disc is formed by the objective lens on the data recording layer of the objective lens without using a coupling lens.

10 Claims, 9 Drawing Sheets

— SA
······ SC

OPTICAL SYSTEM OF OPTICAL PICK-UP

BACKGROUND OF THE INVENTION

The present invention relates to an optical system for an optical pick-up which is capable of recording data to and/or reproducing data from one or more kinds of optical discs having different thicknesses of cover layers.

There are various types of optical discs such as a CD (compact disc) and a DVD (digital versatile disc). The DVD has the cover layer thinner than that of the CD, and has a data recording density larger than that of the CD. For supporting both of the CD and DVD, the optical pick-up is required to have a configuration which enables to correct a spherical aberration which changes depending on the thickness of cover layer of an optical disc being used and to change NA (numerical aperture) of a light beam so as to attain a diameter of a beam spot suitable for the data recording density of the optical disc being used.

In general, the optical pick-up has a light source for emitting the light beam, a coupling lens, and an objective lens. The coupling lens has the function of collimating the light beam emitted by the light source, or changing the degree of divergence of the light beam. That is, the coupling lens is employed in the optical pick-up to suppress aberrations or to enhance the efficiency of use of light.

There is a demand for decreasing the number of optical components in the optical pick-up to decrease the cost of the optical pick-up and to further downsize the optical pick-up. Each of Japanese Patent Provisional Publications No. HEI 8-62496, HEI 8-334686, SHO 64-25113 and HEI 2-223906 discloses an optical pick-up which does not require the coupling lens. The optical pick-up disclosed in each of the publications is configured to form a relatively large beam spot suitable for the optical disc having a relatively lower recoding density and having a relatively thick cover layer such as the CD or CD-R. In the optical pick-up, the relatively large beam spot is attained by a relatively small NA.

More specifically, the optical pick-up disclosed in each of the publications is designed to suppress aberrations specifically for the CD or CD-R. In this optical pick-up, an on-axis aberration (spherical aberration) and/or aberrations caused by odd-axis light (including principally a coma and astigmatism), which occur when the objective lens is shifted along an optical axis of the objective lens for a focusing operation or when the objective lens is shifted in a direction perpendicular to the optical axis for a tracking operation and etc., are suppressed specifically for the CD and CD-R.

However, when the optical pick-up disclosed in each of the publications is used to record data to and/or reproduce data from the DVD, the effect of the amounts of aberrations caused when the objective lens shifts due to the focusing operation or the tracking operation increases to a degree that the recording or reproducing operation is affected.

The reason is that the DVD has the relatively high data recording density, and therefore it is necessary to form a relatively small beam spot by using an objective lens having a relatively high NA. Also, the tolerance to the aberrations of the DVD is smaller than that of the CD. For this reason, the optical pick-up is required to have the coupling lens to support the optical disc having relatively high recording density.

CD/DVD compatible optical pick-up devices configured to record data to and/or reproduce data from both of the CD and DVD have also been developed and widely used. In such a CD/DVD compatible optical pick-up, the same problem may occur when the configuration of the optical pick-up disclosed in one of the above mentioned publications is employed in the CD/DVD compatible optical pick-up.

That is, although the CD/DVD compatible optical pick-up has to suppress aberrations for each of the plurality of types of optical discs, such a requirement can not be accomplished when the configuration of the optical pick-up disclosed in one of the above mentioned publications is employed. For this reason, the CD/DVD compatible optical pick-up is also required to have the coupling lens.

SUMMARY OF THE INVENTION

The present invention is advantageous in that it provides an optical system of an optical pick-up which is capable of sufficiently suppressing aberrations caused by recording and reproducing operation and which does not require to have a coupling lens.

According to an aspect of the invention, there is provided an optical system of an optical pick-up, which is provided with a light source that emits a light beam, and an objective lens that converges the light beam emitted by the light source onto a data recording layer of an optical disc. The optical system satisfies a condition:

$$0.75 < d \cdot (M-1)/(M \cdot L) < 1.0 \tag{1}$$

where d (mm) represents a thickness of the objective lens, M represents magnification of the optical system, and L (mm) represents an O/I distance which is defined as a distance between an object and an image. A beam spot suitable for the optical disc is formed by the objective lens on the data recording layer of the optical disc without using a coupling lens.

By designing the optical system to satisfy the condition (1), astigmatism is sufficiently suppressed while a suitable working distance can be secured. If the $d \cdot (M-1)/(M \cdot L)$ gets larger than the upper limit of the condition (1) when the thickness d is set at an excessively large value, the objective lens becomes too large and a suitable working distance can not be secured. If the $d \cdot (M-1)/(M \cdot L)$ gets lower than the lower limit of the condition (1) when the thickness d is set at an excessively small value, the astigmatism is not sufficiently corrected.

Optionally, when a numerical aperture NA of the objective lens on an optical disc side is larger than or equal to 0.55, the optical system may satisfy a condition:

$$-0.0016 < M \cdot NA^2/L < -0.0007 \tag{2}$$

When the $M \cdot NA^2/L$ gets larger than the upper limit of the condition (2), efficiency of use of light becomes too low or the O/I distance becomes too large for practical use. When the $M \cdot NA^2/L$ gets lower than the lower limit of the condition (2), the astigmatism becomes too large when the objective lens is shifted from the optical axis of the objective lens by the tracking operation, and thereby a suitable beam spot can not be formed.

Still optionally, the O/I distance L and the magnification M may respectively satisfy conditions:

$$30 < L < 50 \tag{3}$$

$$-1/10 < M < -1/12.5 \tag{4}$$

Still optionally, the O/I distance L may satisfy a condition:

$$30 < L < 45 \tag{5}$$

The astigmatism can be reduced by bringing the magnification M close to zero and by increasing the O/I distance L. However, the efficiency of use of light decreases and the working distance becomes short as the magnification approaches to zero. In addition, when the O/I distance becomes large, the size of the entire optical system becomes too large. For this reason, it is preferable that the optical system satisfies the conditions (3) and (4). Further, in this regard, it is more preferable that the optical system satisfies the condition (5).

When the O/I distance gets larger than the upper limit of the condition (3), although the aberrations can be corrected, the size of the entire optical system becomes too larger. When the O/I distance gets lower than the lower limit of the condition (3), it becomes difficult to suppress the aberrations.

When the magnification M gets larger than the upper limit of the condition (4), the efficiency of use of light decreases. When the magnification M gets lower than the lower limit of the condition (4), the amount of the aberration becomes larger than an allowable range.

Similarly to the configurations of the optical system according to the above mentioned aspect of the invention, with regard to an optical system of an optical pick-up used for recording data to and/or reproducing data from a plurality of types of optical discs having different thicknesses of cover layers, it is also possible to configure the optical system to satisfy each of the above mentioned conditions (1)–(5) for each of the plurality of types of the optical discs as follows.

According to another aspect of the invention, there is provided an optical system of an optical pick-up used for recording data to and/or reproducing data from a plurality of types of optical discs having different thicknesses of cover layers. The optical system includes a light source having a plurality of light emitting portions that respectively emit light beams having different wavelengths, and an objective lens that converges each of the light beams emitted by the light emitting portions onto a data recording layer of corresponding one of the plurality of types of optical discs. The optical system satisfies a condition:

$$0.75 < d \cdot (M_i - 1)/(M_i \cdot L_i) < 1.0 \qquad (6)$$

where d (mm) represents a thickness of the objective lens, $M_i$ represents magnification of the optical system, $L_i$ (mm) represents an O/I distance which is defined as a distance between an object and an image, and i (i is a natural number ranging from 1 to j; $j \geq 2$) represents a type of each of the plurality of types of the optical discs, given that i (i=1,2, ..., j) respectively correspond to a $1^{st}$, $2^{nd}$, ..., j-th ones of the plurality of types of the optical discs, the thicknesses of cover layers of the plurality of types of the optical discs satisfying a relationship $1^{st}$ disc < $2^{nd}$ disc < ... < j-th disc.

In this structure, a beam spot suitable for each of the plurality of types of the optical discs is formed by the objective lens on the data recording layer of the corresponding one of the plurality of types of the optical discs without using a coupling lens.

With this configuration, by designing the optical system to satisfy the condition (6), astigmatism is sufficiently suppressed while a suitable working distance can be secured.

Optionally, when a numerical aperture NA of the objective lens on an optical disc side is larger than or equal to 0.55, the optical system may satisfy a condition:

$$-0.0016 < M_k \cdot NA_k^2 / L_k < -0.0007 \qquad (7)$$

where $M_k$, $NA_k$ and $L_k$ respectively represent the magnification, the numerical aperture and the O/I distance when a k-th ($1 \leq k \leq j$) optical disc having the numerical aperture larger then or equal to 0.55 is used.

Still optionally, the O/I distance $L_i$ and the magnification $M_i$ may respectively satisfy conditions:

$$30 < L_i < 50 \qquad (8), \text{and}$$

$$-1/10 < M_i < -1/12.5 \qquad (9).$$

Still optionally, the O/I distance $L_i$ satisfies a condition:

$$30 < L_i < 45 \qquad (10).$$

Still optionally, the plurality of light emitting portions may be aligned in a line which is perpendicular to a direction in which the objective lens is moved by a focusing operation and is perpendicular to a direction in which the objective lens is moved by a tracking operation.

With this structure, the aligning direction of the light emitting portions does not coincide with a component of an image height due to a tracking shift of the objective lens. Therefore, it becomes possible to prevent occurrence of a phenomenon in which the image height becomes too large due to the tracking shift of the objective lens.

Still optionally, both of lens surfaces of the objective lens may be aspherical surfaces. The objective lens may have a diffracting structure on one of the lens surfaces, the diffracting structure having a function of forming a beam spot suitable for each of the plurality of types of optical discs.

BRIEF DESCRIPTION OF THE ACCOMPANYING DRAWINGS

Figure 18A:
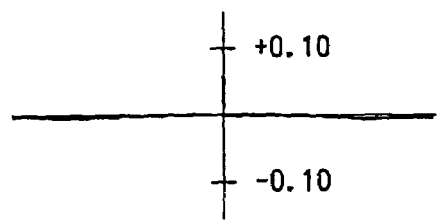
FIG. 18A is a graph of wavefront aberration which is caused in the fourth example in a meridional direction when the objective lens is situated at an initial position during the use of the optical disc having thicker cover layer.
Figure 18B:
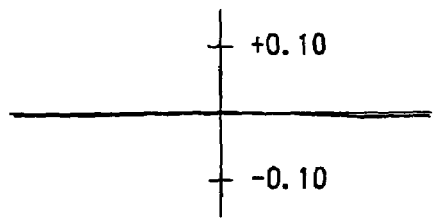
FIG. 18B is a graph of wavefront aberration which is caused in the fourth example in a sagittal direction when the objective lens is situated at the initial position during the use of the optical disc having thicker cover layer.
Figure 18C:
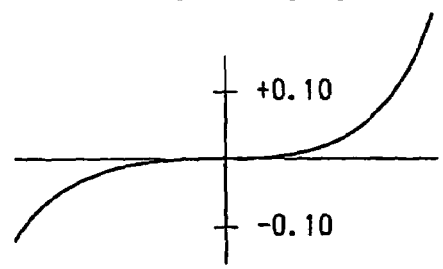
Figure 18D:
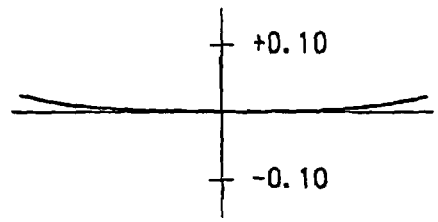

FIG. 18C is a graph of wavefront aberration which is caused in the fourth example in a meridional direction when the objective lens is shifted by tracking operation during the use the optical disc having thicker cover layer; and FIG. 18D is a graph of wavefront aberration which is caused in the fourth example in a sagittal direction when the objective lens is shifted by tracking operation during the use of the optical disc having thicker cover layer.

DETAILED DESCRIPTION OF THE EMBODIMENTS

Hereinafter, embodiments according to the invention are described with reference to the accompanying drawings.

First Embodiment

Figure 1:
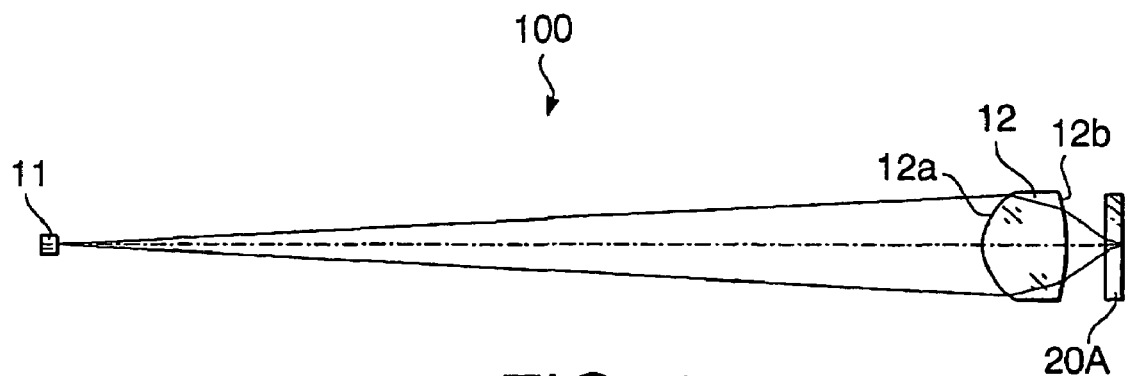
FIG. 1 shows a configuration of an optical system according to a first embodiment of the invention.

FIG. 1 shows a configuration of an optical system 100 according to a first embodiment of the invention. The optical system 100 is used in an optical pick-up of an optical disc apparatus which records data to and/or reproduces data from an optical disc 20A having relatively high recording density and having relatively thin cover layer. The optical disc 20A is, for example, a DVD.

The optical system 100 includes a light source 11 and an objective lens 12. The optical disc 20A shown in FIG. 1 is placed on a turntable (not shown) provided in the optical disc apparatus.

As shown in FIG. 1, the optical system 100 does not have a coupling lens. That is, a laser beam emitted by the light source 11 is converged onto a data recording layer of the optical disc 20A only by the objective lens 12.

The light source 11 emits the laser beam having a relatively short wavelength suitable for the optical disc 20A. The laser beam emitted by the light source 11 is converged by the objective lens 12 to have a relatively small beam spot on the data recording layer of the optical disc 20A.

The objective lens 12 has a lens surface 12a (on a light source side) and a lens surface 12b (on an optical disc side). Both of the lens surfaces 12a and 12b are aspherical surfaces. Further, the objective lens 12 is configured to have a diffracting structure on at least one of the lens surfaces 12a and 12b. The diffracting structure has a plurality of concentric annular zones. That is, the diffracting structure has a plurality of concentric ring-shaped minute steps.

The diffracting structure has the function of canceling a spherical aberration caused when linear expansion and a refractive index of material of the objective lens 12 changes due to temperature variations with a change of a spherical aberration given by the diffracting structure due to the temperature variations. More specifically, the spherical aberration given by the diffracting structure is changed by a change of an oscillation wavelength of the light source 11 caused when the temperature changes. With this structure, the optical system 100 is capable of forming the beam spot suitable for the optical disc 20A on the data recording layer of the optical disc 20A within a wide temperature range.

Astigmatism (which is one of off-axis aberrations) can be corrected by changing a lens thickness. For this reason, the optical system 100 is configured to satisfy a condition:

$$0.75 < d \cdot (M-1)/(M \cdot L) < 1.0 \quad (1)$$

where d (mm) represents a thickness of the objective lens 12, M represents magnification of the optical system 100, and L represents an O/I distance (a distance between an object and an image). The O/I distance L can be defined as $\Sigma(t/n)$ where t (mm) represents the thickness of a medium, and n represents a refractive index at a design wavelength of the medium.

By designing the thickness d of the objective lens 12 to satisfy the condition (1) (i.e., by designing the optical system 100 to satisfy the condition (1)), astigmatism is sufficiently suppressed while a suitable working distance can be secured.

To record data to and/or reproduce data from the optical disc 20A, the optical system 100 is configured such that the NA of the objective lens on an optical disc side becomes larger than or equal to 0.55. If the NA of the objective lens 12 on the optical disc side is larger than or equal to 0.55, the optical system 100 is configured to satisfy a condition:

$$-0.0016 < M \cdot NA^2/L < -0.0007 \quad (2).$$

The condition (2) can be regarded as a condition which defines the amount of astigmatism generated in the optical system 100. By determining the magnification M and the O/I distance so that the condition (2) is satisfied (i.e., so that the amount of astigmatism is within a range defined by the condition (2)), it becomes possible to attain cost reduction and downsizing of the optical system 100 while the astigmatism is sufficiently suppressed.

Further, in this embodiment, the optical system 100 is configured to satisfy the following conditions (3) and (4).

$$30 < L < 50 \quad (3)$$

$$-1/10 < M < -1/12.5 \quad (4)$$

That is, the O/I distance is determined to satisfy the condition (3) and the magnification is determined to satisfy the condition (4).

By determining the magnification M and the O/I distance so that the conditions (3) and (4) are satisfied, it becomes possible to attain cost reduction and downsizing of the optical system 100 while aberrations (in particular, a coma) are sufficiently suppressed and the efficiency of use of light is enhanced.

When the optical system 100 is configured to further satisfy the following condition (5), the downsizing of the optical system 100 is attained more effectively.

$$30 < L < 45 \quad (5)$$

Second Embodiment

Figure 2:
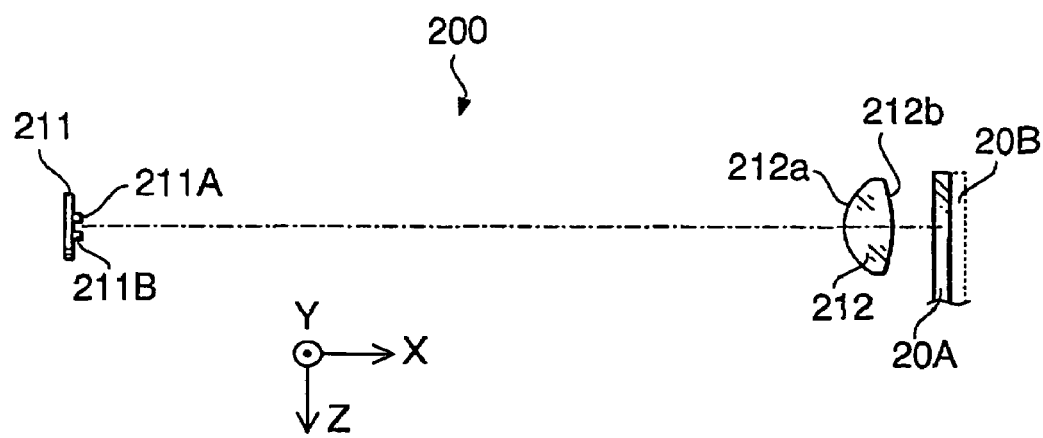
FIG. 2 shows a configuration of an optical system according to a second embodiment of the invention.

Hereafter, a second embodiment of the invention will be described. FIG. 2 shows a configuration of an optical system 200 according to the second embodiment of the invention. In FIG. 2 (and in FIG. 3), to elements which are similar to those in FIG. 1, the same reference numbers are assigned, and the detailed description thereof will not be repeated.

The optical system 200 is used in an optical pick-up of an optical disc apparatus which records data to and/or reproduces data from a plurality of types of optical discs having different thicknesses of cover layers. In this embodiment, the optical system 200 is used to record data to and/or reproduce data from the optical disc 20A and an optical disc 20B. The optical disc 20B has the thickness of cover layer larger than that of the optical disc 20A and has a recording density lower than that of the optical disc 20A. The optical disc 20B is, for example, a CD. One of the optical discs 20A and 20B is placed on a turntable (not shown) provided in the optical disc apparatus.

As shown in FIG. 2, the optical system 200 includes a light source 211 and an objective lens 212. In FIG. 2, an optical axis of the objective lens 212 is shown by a chain line. X direction is a direction in which the objective lens 212 shifts due to the focusing operation. Y direction is a direction in which the objective lens 212 shifts due to the tracking operation. Z direction is perpendicular to both of the X and Y directions.

The light source 211 has two light emitting portions 211A and 211B aligned along a line parallel with the Z direction. By thus arranging the light emitting portions 211A and 211B, it is prevented that an image height becomes excessively large.

The light emitting portion 211A emits a light beam whose wavelength is shorter than that of a light beam emitted by the light emitting portion 211B. Hereafter, the laser beam having a relatively short wavelength emitted by the light emitting portion 211A is referred to as a first laser beam, and the laser beam having a relatively long wavelength emitted by the light emitting portion 211B is referred to as a second laser beam.

When the recordation and/or the reproduction of the optical disc 20A is performed, the first laser beam is used to form a beam spot having a relatively small diameter on a data recording layer of the optical disc 20A. When the recordation and/or the reproduction of the optical disc 20B is performed, the second laser beam is used to form a beam spot having a relatively large diameter on a data recording layer of the optical disc 20B.

As shown in FIG. 2, the optical system 200 does not have a coupling lens. When the optical disc 20A is used, the first laser beam emitted by the light emitting portion 211A is converged by the objective lens 212 on the data recording layer of the optical disc 20A. When the optical disc 20B is used, the second laser beam emitted by the light emitting portion 211B is converged by the objective lens 212 on the data recording layer of the optical disc 20B.

The objective lens 212 has a lens surface 212a (on a light source side) and a lens surface 212b (on an optical disc side). Both of the lens surfaces 212a and 212b are aspherical surfaces. Further, the objective lens 212 is configured to have a diffracting structure on at least one of the lens surfaces 212a and 212b. The diffracting structure has a plurality of concentric annular zones. That is, the diffracting structure has a plurality of concentric ring-shaped minute steps.

Figure 4:
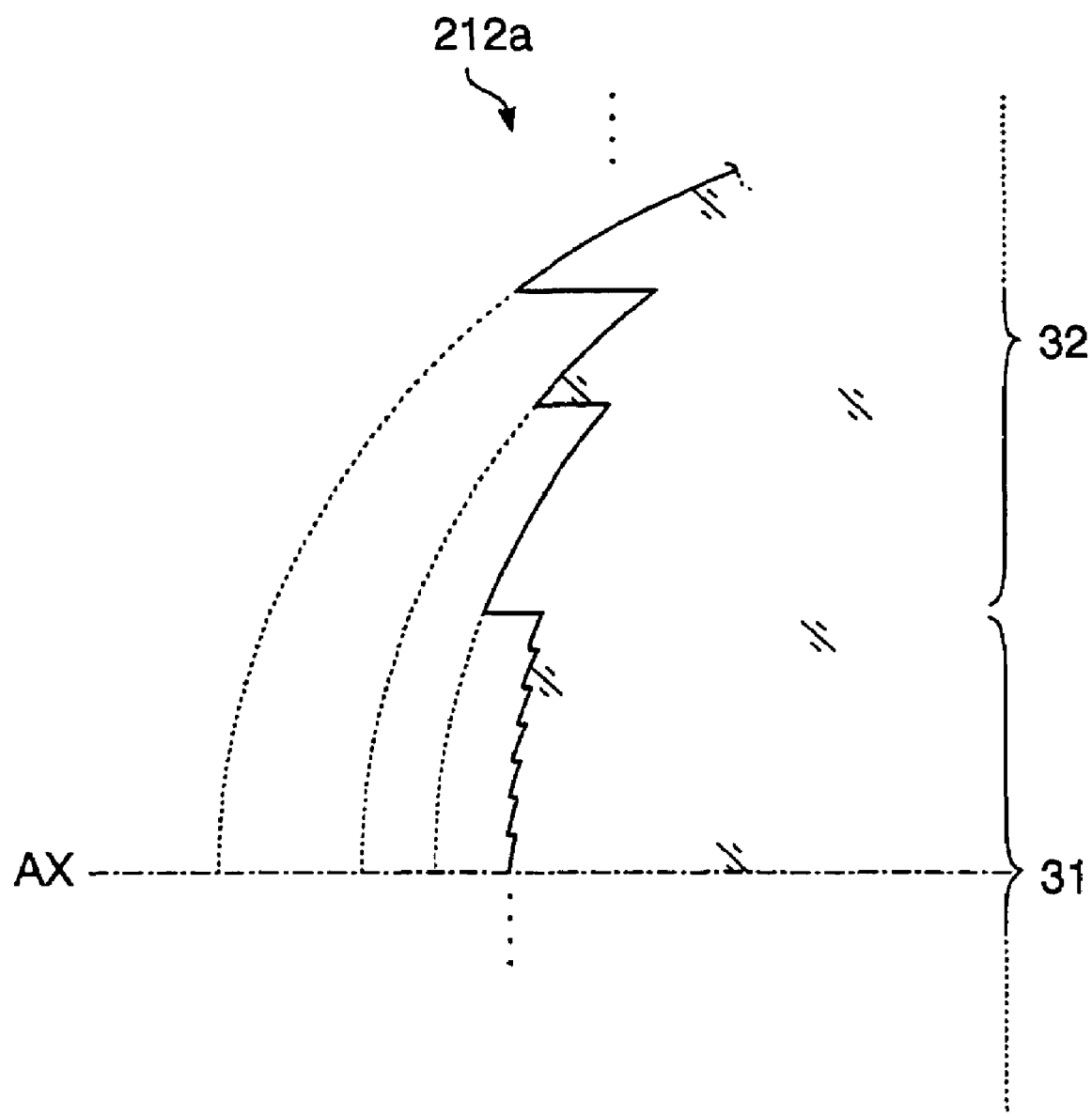
FIG. 4 shows an enlarged view of a cross section of an objective lens shown in FIG. 2 illustrating in detail a diffracting structure formed on a lens surface of the objective lens.

FIG. 4 shows an enlarged view of a cross section of the objective lens 212 in the vicinity of the optical axis Ax of the objective lens 212 illustrating in detail the diffracting structure formed on the lens surface 212a of the objective lens 212. FIG. 4 is an example of the structure of the objective lens 212 when the diffracting structure is formed on the lens surface 212A of the objective lens 212.

The lens surface 212a is configured as follows. The lens surface 212a has an inner area 31 including the optical axis Ax, and an outer area 32 outside the inner area 31. As can be seen from FIG. 4, the annular zones formed within the inner and outer areas 31 and 32 have steps between adjacent annular zones, and at each step the thickness of the objective lens 212 changes in an increasing direction. That is, at each step, the outside annular zone of the step protrudes with respect to the inside annular zone of the step.

The diffracting structure within the inner area 31 has the function of suitably converging the first laser beam on the data recording layer of the optical disc 20A with the aberrations being nearly equal zero. Further, the diffracting structure within the inner area 31 has the function of suitably converging the second laser beam on the data recording layer of the optical disc 20B with the aberrations being nearly equal zero.

The diffracting structure within the outer area 32 has the function of suitably converging the first laser beam on the data recording layer of the optical disc 20A. More specifically, the outer area 32 is configured such that a wavefront of the first laser beam passed through the outer area 32 is continuously connected to a wavefront of the first laser beam passed through the inner area 31. With this structure, the relatively high NA can be attained by the first laser beam passed through both of the inner and outer areas 31 and 32, and thereby the relatively small beam spot can be formed on the data recording layer of the optical disc 20A.

Further, the outer are 32 is configured such that the second laser beam is diffused on the data recording layer of the optical disc 20B. Therefore, only the second laser beam passed through the inner area 31 contributes to the formation of the beam spot for the optical disc 20B. Consequently, the relatively large beam spot of the second laser beam is formed on the data recording layer of the second optical disc 20B.

Similarly to the first embodiment, the optical system 200 is configured to satisfy the conditions (1)~(5) with regard to each of the optical discs 20A and 20B. Therefore, aberrations (in particular, the aberrations caused by the off-axis light) are sufficiently suppressed.

Since the optical system 200 is used for the plurality of types of optical discs including the optical discs 20A and 20B, the conditions (1)~(5) are changed to the following conditions (6)~(10), respectively.

$$0.75 < d \cdot (M_i - 1)/(M_i \cdot L_i) < 1.0 \quad (6)$$

$$-0.0016 < M_k \cdot NA_k^2 / L_k < -0.0007 \quad (7)$$

$$30 < L_i < 50 \quad (8)$$

$$-1/10 < M_i < -1/12.5 \quad (9)$$

$$30 < L_1 < 45 \quad (10)$$

In the above conditions (6)~(10), i (which takes a value from 1 to j) is used to represent the type of the optical disc being used. Given that i=1, 2, 3, . . . , j correspond to a $1^{st}$, $2^{nd}$, $3^{rd}$, . . . , j-th optical discs, respectively, the thickness of cover layers of these optical discs is:

$1^{st}$ disc < $2^{nd}$ disc < $3^{rd}$ disc < . . . < j-th disc.

Since in this embodiment, the optical system 200 supports two optical discs 20A and 20B, j is 2. "i=1" represents the case of optical disc 20A, and "i=2" represents the case of optical disc 20B. $M_k$, $NA_k$ and $L_k$ respectively represent the magnification, the numerical aperture and the O/I distance when the k-th ($1 \leq k \leq j$) optical disc having the numerical aperture larger then or equal to 0.55 is used. In this embodiment, k is 1 (i.e., k represents the case of the optical disc 20A).

By satisfying the conditions (6)~(10), aberrations (in particular, the aberrations, such as a coma and astigmatism, caused by the off-axis light caused when the optical disc 20A is used) are sufficiently suppressed.

It should be noted that the above mentioned advantage in the first embodiment attained by satisfying the condition (1) is also attained in the second embodiment by satisfying the condition (6). Also, the above mentioned advantage in the first embodiment attained by satisfying the condition (2) is also attained in the second embodiment by satisfying the condition (7). The above mentioned advantage in the first embodiment attained by satisfying the conditions (3) and (4) is also attained in the second embodiment by satisfying the conditions (8) and (9). The above mentioned advantage in the first embodiment attained by satisfying the condition (5) is also attained in the second embodiment by satisfying the condition (10).

In the above mentioned explanations the diffracting structure is used to form the beam spot suitable for each of the optical discs 20A and 20b. In other words, the diffracting structure is used to attain compatibility for both of the optical discs 20A and 20B. However, the objective lens 212 may employ another structure to attain the compatibility for both of the optical discs 20A and 20B.

Hereafter, one concrete example (first example) according to the first embodiment and three concrete examples (second, third and fourth examples) according to the second embodiment will be described.

FIRST EXAMPLE

An optical system according to a first example has a configuration described in the first embodiment with reference to FIG. 1. Therefore, the first example will be explained with reference to FIG. 1. Tables 1 and 2 show a numerical configuration of the optical system 100 of the first example.

TABLE 1

| | Optical Disc 20A |
|---|---|
| M | −1/10.40 |
| DESIGN WAVELENGTH | 655 |
| NA | 0.60 |
| L | 38.90 |

TABLE 2

| Surface Number | r | d1 | n | ν |
|---|---|---|---|---|
| #0 | | 35.00 | | |
| #1 | 2.150 | 3.20 | 1.544 | 55.7 |
| #2 | −3.815 | 1.45 | | |
| #3 | | 0.60 | 1.585 | 29.9 |
| #4 | | — | | |

In Table 1, M represents the magnification, the design wavelength is a wavelength suitable for the recordation/reproduction of the optical disc being used, NA is a numerical aperture on the optical disc side, and L represents the O/I distance (mm). In this example, the optical disc 20A (e.g., DVD) is used. These symbols are also applied to similar tables in concrete examples indicated below.

In Table 2, "surface number" represents a surface number of each surface of optical components in the optical system 100. A surface #0 is the light source 11, surfaces #1 and #2 are the lens surfaces 12a and 12b of the objective lens 12, respectively, and surfaces #3 and #4 represent the cover layer and data recording layer of the optical disc 20A, respectively.

In Table 2, "r" represents a radius of curvature (unit: mm) of each lens surface on the optical axis. "d1" represents a thickness of a lens (when the optical disc 20A is used) or a distance (unit: mm) from a lens surface to a next lens surface. "n" represents a refractive index at a d-ray (588 nm). "ν" represents an Abbe constant at the d-ray. These symbols are also applied to similar tables in concrete examples indicated below.

Each of the lens surfaces 12a and 12b (#1 and #2) of the objective lens 12 is an aspherical surface. The aspherical surface is expressed by a following equation:

$$X(h) = \frac{ch^2}{1 + \sqrt{1 - (1+K)c^2h^2}} + A_4h^4 + A_6h^6 + A_8h^8 + A_{10}h^{10} + A_{12}h^{12}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

Table 3 shows the conical coefficient and aspherical coefficients of the lens surfaces 12a and 12b (#1 and #2) of the objective lens 12.

TABLE 3

| Surface No. | #1 | #2 |
|---|---|---|
| K | −0.5000 | 0.0000 |
| A4 | −3.9860E−03 | 3.8600E−02 |
| A6 | −2.3940E−04 | −1.3520E−02 |
| A8 | −4.4190E−05 | 3.4730E−03 |
| A10 | −4.4090E−06 | −5.5530E−04 |
| A12 | −7.5730E−07 | 4.1230E−05 |

In Table 3 (and in the following similar Tables), a notation symbol E indicates that 10 is used as a radix and a right side value of E is used as an exponent.

The diffracting structure is formed on the lens surface 12a (#1) of the objective lens 12. The diffracting structure is expressed by an optical path difference function Φ(h):

$$\Phi(h) = (P_2h^2 + P_4h^4 + P_6h^6 + \ldots) \times m \times \lambda$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffractive lens structure and an optical path length of a ray of light which is diffracted by the diffraction lens structure, at the height h from the optical axis. In other words, the optical path difference Φ(h) represents the additional optical path length of each ray of light which is diffracted by the diffractive lens structure. "m" represents the diffraction order. In this example, m is 1, i.e., the first order diffracted light is used.

Table 4 shows values of the coefficients of the optical path difference function Φ(h) applied to the diffracting structure formed on the lens surface 12a (#1) of the objective lens 12.

TABLE 4

| coefficient | Surface #1 |
|---|---|
| P2 | 2.0000 |
| P4 | −1.6940 |
| P6 | 0.0000 |

According to the above mentioned configuration, d·(M−1)/(M·L) is 0.94, and M·NA²/L is −0.00089. Therefore, the condition (1) and the condition (2) are satisfied. As can be seen from Table 1, the condition (3), the condition (4) and condition (5) are satisfied.

Figure 5:
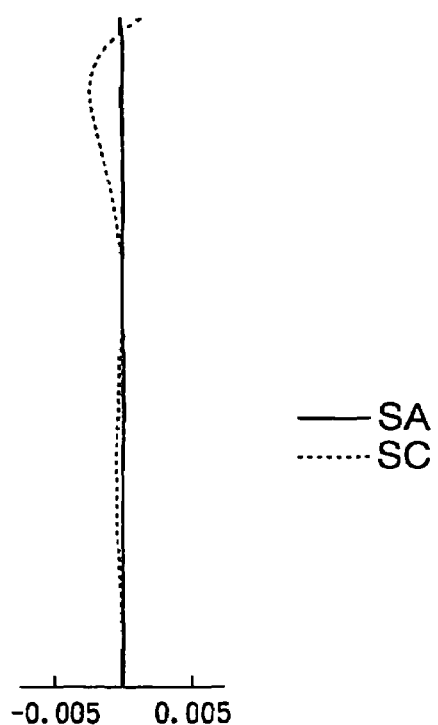
FIG. 5 is a graph showing spherical aberration and a sine condition caused with regard to a first example according to the first embodiment.

FIG. 5 is a graph showing the spherical aberration and a sine condition caused when the first laser beam passes through the objective lens 12. In FIG. 5 (and in the following similar graphs), the spherical aberration is represented by a solid line and the sine condition is represented by a dashed line. As shown in FIG. 5, the spherical aberration is sufficiently corrected.

Figure 6A:
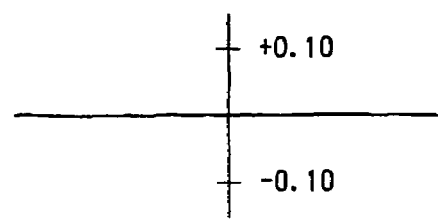
FIG. 6A is a graph of wavefront aberration which is caused in the first example in a meridional direction when the objective lens is situated at an initial position.
Figure 6B:
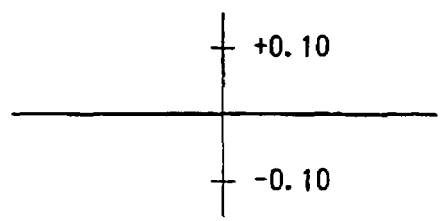
FIG. 6B is a graph of wavefront aberration which is caused in the first example in a sagittal direction when the objective lens is situated at the initial position.
Figure 6C:
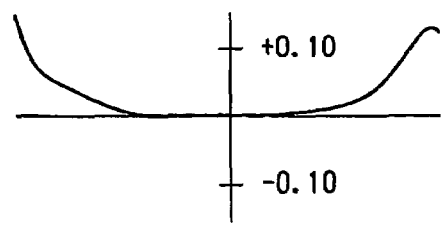
FIG. 6C is a graph of wavefront aberration which is caused in the first example in a meridional direction when the objective lens is shifted by tracking operation.
Figure 6D:
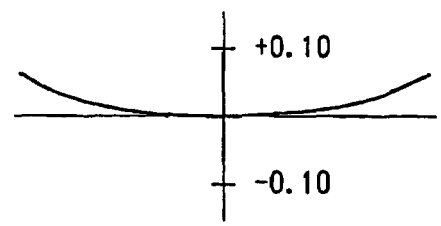
FIG. 6D is a graph of wavefront aberration which is caused in the first example in a sagittal direction when the objective lens is shifted by tracking operation.

Each of FIGS. 6A, 6B, 6C and 6D is a graph of a wavefront aberration indicating a transverse aberration. In each graph (and in the following similar graphs), the horizontal axis represents a pupil coordinate, and the vertical axis represents the wavefront aberration. FIGS. 6A and 6C show the wavefront aberration in a meridional direction. FIGS. 6B and 6D show the wavefront aberration in a sagittal direction. Each of FIGS. 6A and 6B shows a case where the objective lens 12 is situated at an initial position (i.e., the objective lens 12 is located on the optical axis). Each of FIGS. 6C and 6D shows a case where the objective lens 12 is shifted from the optical axis by 0.4 mm by the tracking operation (in a direction corresponding to the Y direction shown in FIG. 2).

As shown in FIGS. 6A and 6B, when the objective lens 12 is located on the optical axis, the spherical aberration is substantially zero. As shown in FIGS. 6C and 6D, even if the objective lens 12 is shifted by the tracking operation, the coma is sufficiently suppressed in each of the meridional direction and the sagittal direction.

Since the optical system 100 according to the first example does not require the coupling lens, const reduction and downsizing of the optical system can be attained. Since all of the conditions (1)~(5) are satisfied, the aberrations including the coma and astigmatism caused by the tracking operation are effectively suppressed while const reduction and downsizing of the optical system are attained. The beam spot having the diameter suitable for the optical disc 20A can be formed on the data recording layer of the optical disc 20A.

SECOND EXAMPLE

An optical system of a second example according to the second embodiment has a configuration described in the second embodiment with reference to FIG. 2. Therefore, the second example will be explained with reference to FIG. 2. Tables 5 and 6 show a numerical configuration of the optical system 200 of the second example.

TABLE 5

|   | Optical Disc 20A | Optical Disc 20B |
|---|---|---|
| M | −1/10.50 | −1/10.53 |
| DESIGN WAVELENGTH | 655 | 785 |
| NA | 0.60 | 0.46 |
| L | 42.09 | 42.48 |

TABLE 6

| Surface Number | r | d1 | d2 | n | ν |
|---|---|---|---|---|---|
| #0 |  | 38.00 | 38.36 |  |  |
| #1 (h < 1.70) | 2.277 | 3.00 | 3.00 | 1.544 | 55.7 |
| #1 (h ≧ 1.70) | 2.287 |  |  | 1.544 | 55.7 |
| #2 | −4.808 | 1.76 | 1.40 |  |  |
| #3 |  | 0.60 | 1.20 | 1.585 | 29.9 |
| #4 |  | — |  |  |  |

Since the optical system 200 supports the optical disc 20A (e.g., DVD) and optical disc 20B (e.g., CD), performance specifications are indicated in Tables 5 and 6 with regard to the optical discs 20A and 20B. In Table 6 (and the following similar tables), "d2" represents a thickness of a lens (when the optical disc 20B is used) or a distance (unit: mm) from a lens surface to a next lens surface.

In Table 6, a surface #0 is the light source 211, surfaces #1 and #2 are the lens surfaces 212a and 212b of the objective lens 212, respectively, and surfaces #3 and #4 represent the cover layer and data recording layer of the optical disc (20A or 20B), respectively.

As shown in Table 6 (and the following tables 7 and 8 of the second example), the lens surface 212a (#1) is divided into the inner area 31 and the outer area 32. The inner area 31 is formed within h (height from the optical axis) <1.70 mm, and the outer area 32 is formed within h≧1.70. The radii of curvature are different between the inner area and the outer area.

Each of the lens surfaces 212a and 212b (#1 and #2) of the objective lens 212 is an aspherical surface. Table 7 shows the conical coefficient and aspherical coefficients of the lens surfaces 212a and 212b (#1 and #2) of the objective lens 212. The aspherical shapes are different between the inner area and the outer area.

TABLE 7

| Surface No. | #1 (h < 1.70) | #1 (h ≧ 1.70) | #2 |
|---|---|---|---|
| K | −0.5000 | −0.5000 | 0.0000 |
| A4 | −3.2520E−03 | −2.4990E−03 | 2.1772E−02 |
| A6 | −2.1480E−04 | −2.4480E−04 | −4.7330E−03 |
| A8 | −3.0620E−05 | −3.1420E−05 | 5.9300E−04 |
| A10 | −2.0990E−07 | −6.7200E−08 | −4.2670E−05 |
| A12 | −9.6000E−07 | −9.7600E−07 | 1.2790E−06 |

Table 8 shows values of the coefficients of the optical path difference function ((h) applied to the diffracting structure formed on the lens surface 212a (#1) of the objective lens 212. The diffracting structures within the inner area and within the outer area are different from each other.

TABLE 8

| coefficient | Surface #1 (h < 1.70) | Surface #1 (h ≧ 1.70) |
|---|---|---|
| P2 | 1.0000 | 0.2075 |
| P4 | −1.3090 | −0.7230 |
| P6 | −0.0550 | −0.1000 |
| P8 | 0.0000 | 0.0000 |

THIRD EXAMPLE

Figure 3:
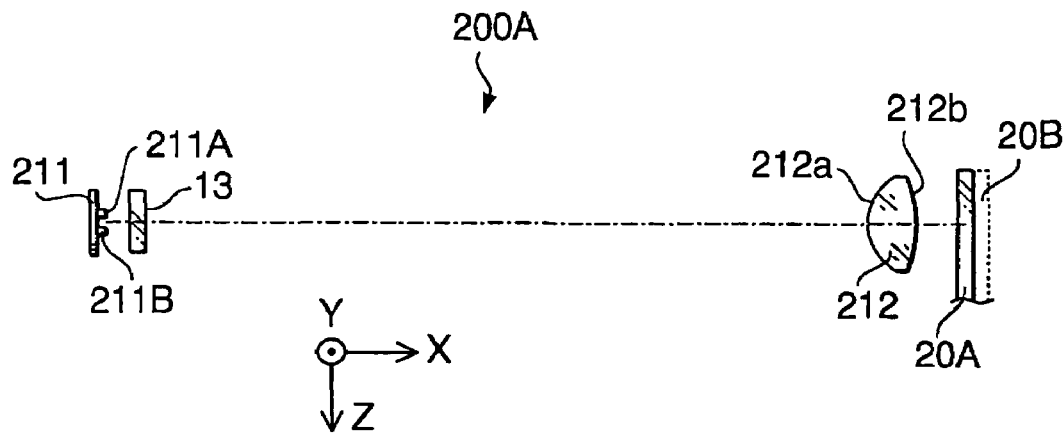
FIG. 3 shows a configuration of an optical system of a third example according to the second embodiment.

FIG. 3 shows a configuration of an optical system 200A of a third example according to the second embodiment. As shown in FIG. 3, the optical system 200A has substantially the same configuration as that shown in FIG. 2 of the second embodiment. A cover glass 13 is additionally provided in the optical system 200A shown in FIG. 3. Tables 9 and 10 show a numerical configuration of the optical system 200A of the third example.

TABLE 9

|   | Optical Disc 20A | Optical Disc 20B |
|---|---|---|
| M | −1/7.85 | −1/7.90 |
| DESIGN WAVELENGTH | 655 | 788 |
| NA | 0.60 | 0.47 |
| L | 30.18 | 30.57 |

TABLE 10

| Surface Number | r | d1 | d2 | n | ν |
|---|---|---|---|---|---|
| #0 |  | 0.23 | 0.23 |  |  |
| #1 |  | 0.25 | 0.25 | 1.516 | 64.1 |
| #2 |  | 26.00 | 26.36 |  |  |
| #3 (h < 1.63) | 2.063 | 2.60 | 2.60 | 1.544 | 55.7 |
| #3 (h ≧ 1.63) | 2.081 |  |  | 1.544 | 55.7 |
| #4 | −4.490 | 1.72 | 1.36 |  |  |

TABLE 10-continued

| Surface Number | r | d1 | d2 | n | ν |
|---|---|---|---|---|---|
| #5 |  | 0.60 | 1.20 | 1.585 | 29.9 |
| #6 |  | — | — |  |  |

Since the optical system 200A supports the optical disc 20A (e.g., DVD) and the optical disc 20B (e.g., CD), performance specifications are indicated in Tables 9 and 10 with regard to the optical discs 20A and 20B.

In Table 10, a surface #0 is the light source 211, surfaces #1 and #2 represents a light source side surface and an optical disc side surface of the cover plate 13, respectively, surfaces #3 and #4 are the lens surfaces 212a and 212b of the objective lens 212, respectively, and surfaces #5 and #6 represent the cover layer and data recording layer of the optical disc (20A or 20B), respectively.

As shown in Table 10 (and the following tables 11 and 12 of the third example), the lens surface 212a of the objective lens 212 (#3) is divided into the inner are 31 and the outer area 32. The inner area 31 is formed within h (height from the optical axis) <1.63 mm, and the outer area 32 is formed within h≧1.63 mm. The radii of curvature are different between the inner area and the outer area.

Each of the lens surfaces 212a and 212b (#3 and #4) of the objective lens 212 is an aspherical surface. Table 11 shows the conical coefficient and aspherical coefficients of the lens surfaces 212a and 212b (#3 and #4) of the objective lens 212. The aspherical shapes are different between the inner area and the outer area.

TABLE 11

| Surface No. | #3 (h < 1.63) | #3 (h ≧ 1.63) | #4 |
|---|---|---|---|
| K | −0.5780 | −0.5780 | 0.0000 |
| A4 | −3.3760E−03 | −2.6540E−03 | 2.7680E−02 |
| A6 | −1.5360E−04 | −1.4062E−04 | −6.8440E−03 |
| A8 | −2.8140E−05 | −2.1910E−05 | 1.3210E−03 |
| A10 | −6.3300E−06 | −6.0420E−06 | −1.5710E−04 |
| A12 | 1.0400E−07 | 1.2270E−07 | 8.6660E−06 |

Table 12 shows values of the coefficients of the optical path difference function Φ(h) applied to the diffracting structure formed on the lens surface 212a (#3) of the objective lens 212. The diffracting structures within the inner area and within the outer area are different from each other.

TABLE 12

| coefficient | Surface #3 (h < 1.63) | Surface #3 (h ≧ 1.63) |
|---|---|---|
| P2 | 1.5000 | −0.2249 |
| P4 | −1.7900 | −1.2740 |
| P6 | −0.0440 | −0.0552 |
| P8 | −0.0038 | 0.0000 |

FOURTH EXAMPLE

FIG. 3 shows a configuration of the optical system 200A of a fourth example according to the second embodiment. As shown in FIG. 3, the optical system 200A has substantially the same configuration as that shown in FIG. 2 of the second embodiment. The cover glass 13 is additionally provided in the optical system 200A shown in FIG. 3. Tables 13 and 14 show a numerical configuration of the optical system 200A of the fourth example.

TABLE 13

|  | Optical Disc 20A | Optical Disc 20B |
|---|---|---|
| M | −1/12.29 | −1/12.32 |
| DESIGN WAVELENGTH | 655 | 788 |
| NA | 0.60 | 0.47 |
| L | 37.12 | 37.50 |

TABLE 14

| Surface Number | r | d1 | d2 | n | ν |
|---|---|---|---|---|---|
| #0 |  | 0.27 | 0.27 |  |  |
| #1 |  | 0.25 | 0.25 | 1.516 | 64.1 |
| #2 |  | 33.60 | 33.96 |  |  |
| #3 (h < 1.34) | 1.730 | 2.20 | 2.20 | 1.544 | 55.7 |
| #3 (h ≧ 1.34) | 1.760 |  |  | 1.544 | 55.7 |
| #4 | −4.060 | 1.28 | 0.92 |  |  |
| #5 |  | 0.60 | 1.20 | 1.585 | 29.9 |
| #6 |  | — | — |  |  |

Since the optical system 200A supports the optical disc 20A (e.g., DVD) and the optical disc 20B (e.g., CD), performance specifications are indicated in Tables 13 and 14 with regard to the optical discs 20A and 20B.

In Table 14, a surface #0 is the light source 211, surfaces #1 and #2 represents a light source side surface and an optical disc side surface of the cover plate 13, respectively, surfaces #3 and #4 are the lens surfaces 212a and 212b of the objective lens 212, respectively, and surfaces #5 and #6 represent the cover layer and data recording layer of the optical disc (20A or 20B), respectively.

As shown in Table 14 (and the following tables 15 and 16 of the fourth example), the lens surface 212a (#3) of the objective lens 212 is divided into the inner are 31 and the outer area 32. The inner area 31 is formed within h (height from the optical axis) <1.34 mm, and the outer area 32 is formed within h≧1.34 mm. The radii of curvature are different between the inner area 31 and the outer area 32.

Each of the lens surfaces 212a and 212b (#3 and #4) of the objective lens 212 is an aspherical surface. Table 15 shows the conical coefficient and aspherical coefficients of the lens surfaces 212a and 212b (#3 and #4) of the objective lens 212. The aspherical shapes are different between the inner area and the outer area.

TABLE 15

| Surface No. | #3 (h < 1.34) | #3 (h ≧ 1.34) | #4 |
|---|---|---|---|
| K | −0.4500 | −0.4500 | 0.0000 |
| A4 | −7.8608E−03 | −6.1175E−03 | 4.8640E−02 |
| A6 | −9.3970E−04 | −4.4280E−04 | −1.8050E−02 |
| A8 | −2.1930E−04 | −9.2210E−05 | 4.4220E−03 |
| A10 | −7.3600E−06 | −3.1590E−05 | −6.2240E−04 |
| A12 | −1.3290E−05 | −8.5430E−06 | 4.1470E−05 |

Table 16 shows values of the coefficients of the optical path difference function Φ(h) applied to the diffracting structure formed on the lens surface 212a (#3) of the objective lens 212. The diffracting structures within the inner area and within the outer area are different from each other.

TABLE 16

| coefficient | Surface #3 (h < 1.34) | Surface #3 (h ≧ 1.34) |
|---|---|---|
| P2 | 1.5000 | −2.5663 |
| P4 | −3.5900 | −2.5500 |
| P6 | −0.3040 | 0.0823 |
| P8 | 0.0000 | 0.0000 |

Table 17 shows values of $d \cdot (M_i - 1)/(M_i \cdot L_i)$ and $M_k \cdot NA_k^2/L_k$ for each of the cases of optical discs 20A and 20b with regard to the second, third and fourth examples. As shown in Table 17, all of optical systems of the second, third and fourth examples satisfy the conditions (6) and (7). The optical systems of the second and fourth examples satisfy the conditions (7), (8) and (9). The optical system of the third example satisfies the conditions (7) and (8). All of the second, third and fourth examples satisfy the condition (10).

TABLE 17

| Examples | Optical disc | $d \cdot (M_i - 1)/(M_i \cdot L_i)$ | $M_k \cdot NA_k^2/L_k$ |
|---|---|---|---|
| 2 | 20A | 0.820 | −0.00081 |
|   | 20B | 0.814 | — |
| 3 | 20A | 0.762 | −0.00152 |
|   | 20B | 0.757 | — |
| 4 | 20A | 0.787 | −0.00079 |
|   | 20B | 0.781 | — |

Figure 7:
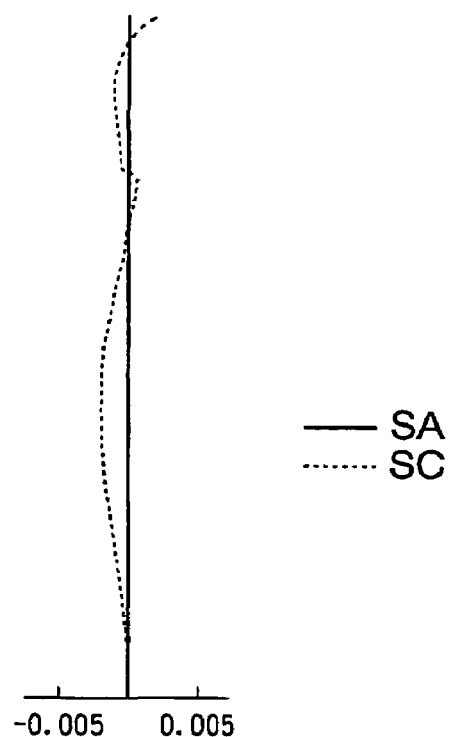
FIG. 7 is a graph showing spherical aberration and a sine condition caused with regard to a second example according to the second embodiment when an optical disc having thinner cover layer is used.

FIGS. 7, 8A–8D, 9, and 10A–10D are graphs illustrating the aberrations caused in the optical system 200 according to the second example. FIG. 7 is a graph showing spherical aberration and a sine condition caused when the optical disc 20A (e.g., DVD) is used in the optical system 200 according to the second example. As shown in FIG. 7, the spherical aberration is sufficiently corrected.

Figure 8A:
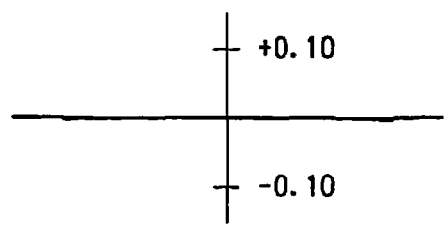
FIG. 8A is a graph of wavefront aberration which is caused in the second example in a meridional direction when the objective lens is situated at an initial position during the use of the optical disc having thinner cover layer.
Figure 8B:
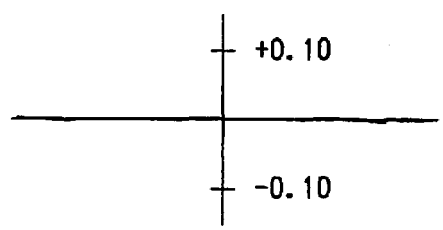
FIG. 8B is a graph of wavefront aberration which is caused in the second example in a sagittal direction when the objective lens is situated at the initial position during the use of the optical disc having thinner cover layer.
Figure 8C:
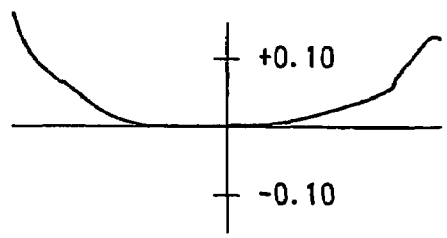
FIG. 8C is a graph of wavefront aberration which is caused in the second example in a meridional direction when the objective lens is shifted by tracking operation during the use the optical disc having thinner cover layer.
Figure 8D:
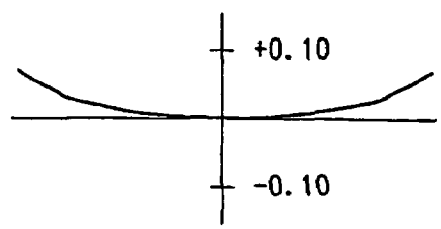
FIG. 8D is a graph of wavefront aberration which is caused in the second example in a sagittal direction when the objective lens is shifted by tracking operation during the use of the optical disc having thinner cover layer.

Each of FIGS. 8A, 8B, 8C and 8D is a graph illustrating wavefront aberration when the optical disc 20A is used in the second example. FIGS. 8A and 8C show wavefront aberration in a meridional direction. FIGS. 8B and 8D show wavefront aberration in a sagittal direction. Each of FIGS. 8A and 8B shows a case where the objective lens 212 is situated at the initial position (i.e., the objective lens 212 is located on the optical axis). Each of FIGS. 8C and 8D shows a case where the objective lens 212 is shifted from the optical axis by 0.4 mm by the tracking operation (in a direction corresponding to the Y direction shown in FIG. 2). As can be seen in FIGS. 8A–8D, aberrations including the coma and astigmatism caused when the tracking operation is performed are sufficiently suppressed.

Figure 9:
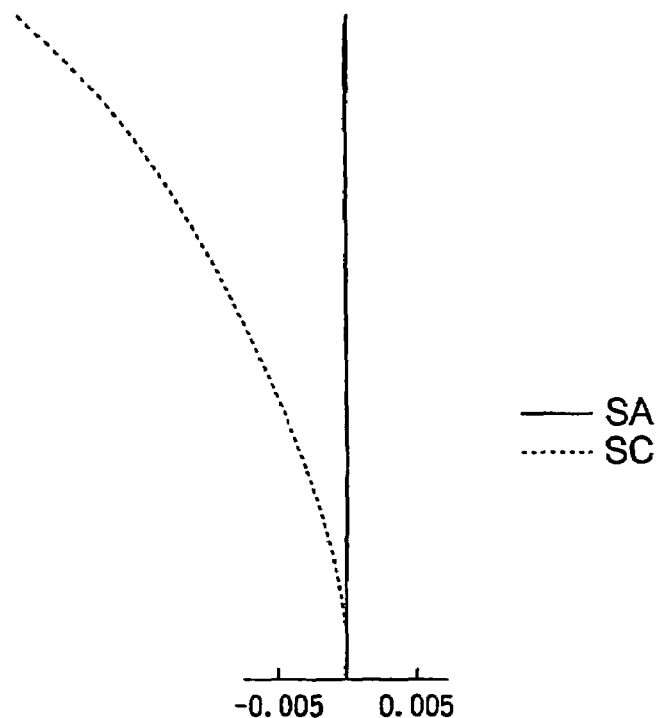
FIG. 9 is a graph showing spherical aberration and a sine condition caused with regard to the second example according to the second embodiment when an optical disc having thicker cover layer is used.

FIG. 9 is a graph showing spherical aberration and a sine condition caused when the optical disc 20B (e.g., CD) is used in the optical system 200 according to the second example. As shown in FIG. 9, the spherical aberration is sufficiently corrected.

Figure 10A:
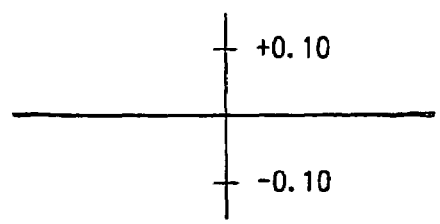
FIG. 10A is a graph of wavefront aberration which is caused in the second example in a meridional direction when the objective lens is situated at an initial position during the use of the optical disc having thicker cover layer.
Figure 10B:
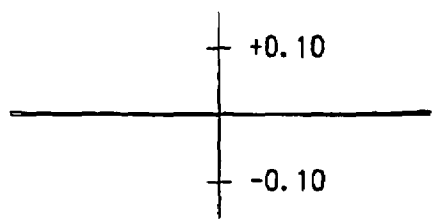
FIG. 10B is a graph of wavefront aberration which is caused in the second example in a sagittal direction when the objective lens is situated at the initial position during the use of the optical disc having thicker cover layer.
Figure 10C:
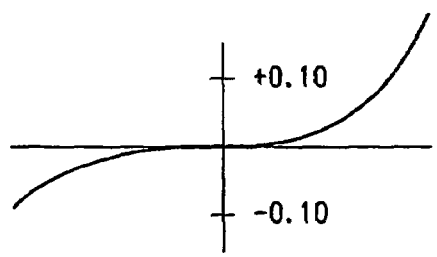
FIG. 10C is a graph of wavefront aberration which is caused in the second example in a meridional direction when the objective lens is shifted by tracking operation during the use the optical disc having thicker cover layer.
Figure 10D:
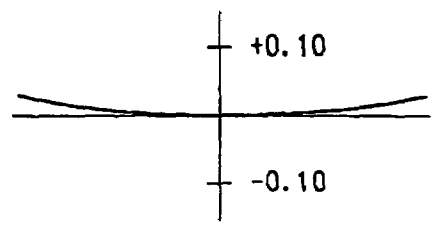
FIG. 10D is a graph of wavefront aberration which is caused in the second example in a sagittal direction when the objective lens is shifted by tracking operation during the use of the optical disc having thicker cover layer.

Each of FIGS. 10A, 10B, 10C and 10D is a graph of wavefront aberration when the optical disc 20B is used in the second example. FIGS. 10A and 10C show wavefront aberration in a meridional direction. FIGS. 10B and 10D show wavefront aberration in a sagittal direction. Each of FIGS. 10A and 10B shows a case where the objective lens 212 is situated at the initial position (i.e., the objective lens 212 is located on the optical axis). Each of FIGS. 10C and 10D shows a case where the objective lens 212 is shifted from the optical axis by 0.4 mm by the tracking operation (in a direction corresponding to the Y direction shown in FIG. 2).

Figure 11:
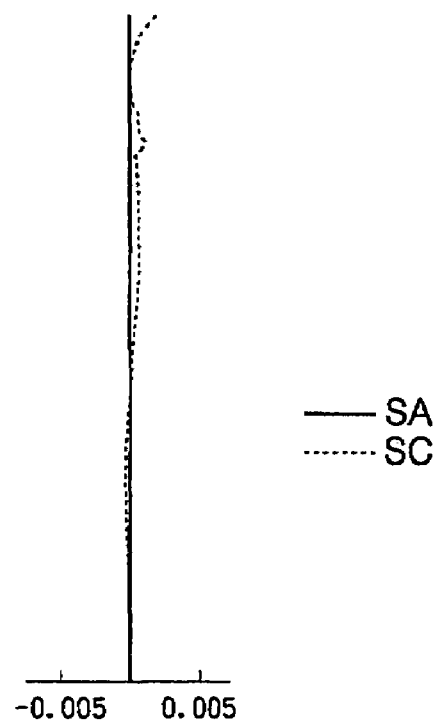
FIG. 11 is a graph showing spherical aberration and a sine condition caused with regard to a third example according to the second embodiment when an optical disc having thinner cover layer is used.

FIGS. 11, 12A–12D, 13, and 14A–14D are graphs illustrating the aberrations caused in the optical system 200A according to the third example. FIG. 11 is a graph showing spherical aberration and a sine condition caused when the optical disc 20A (e.g., DVD) is used in the optical system 200A according to the third example. As shown in FIG. 11, the spherical aberration is sufficiently corrected.

Figure 12A:
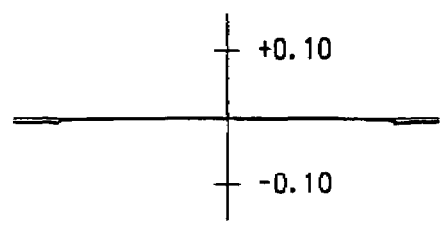
FIG. 12A is a graph of wavefront aberration which is caused in the third example in a meridional direction when the objective lens is situated at an initial position during the use of the optical disc having thinner cover layer.
Figure 12B:
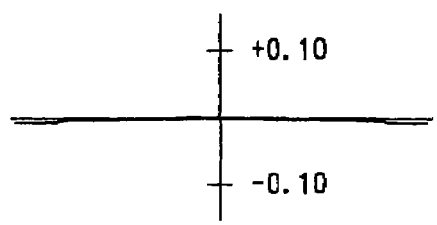
FIG. 12B is a graph of wavefront aberration which is caused in the third example in a sagittal direction when the objective lens is situated at the initial position during the use of the optical disc having thinner cover layer.
Figure 12C:
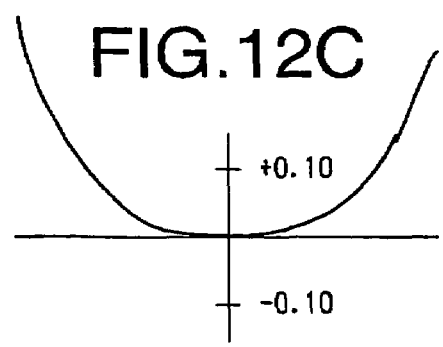
FIG. 12C is a graph of wavefront aberration which is caused in the third example in a meridional direction when the objective lens is shifted by tracking operation during the use the optical disc having thinner cover layer.
Figure 12D:
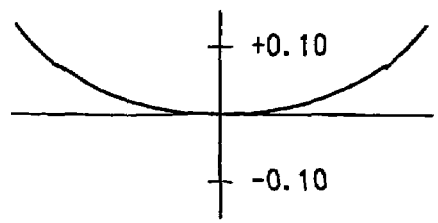
FIG. 12D is a graph of wavefront aberration which is caused in the third example in a sagittal direction when the objective lens is shifted by tracking operation during the use of the optical disc having thinner cover layer.

Each of FIGS. 12A, 12B, 12C and 12D is a graph illustrating wavefront aberration when the optical disc 20A is used in the third example. FIGS. 12A and 12C show wavefront aberration in a meridional direction. FIGS. 12B and 12D show wavefront aberration in a sagittal direction. Each of FIGS. 12A and 12B shows a case where the objective lens 212 is situated at the initial position (i.e., the objective lens 212 is located on the optical axis). Each of FIGS. 12C and 12D shows a case where the objective lens 212 is shifted from the optical axis by 0.4 mm by the tracking operation (in a direction corresponding to the Y direction shown in FIG. 2). As can be seen in FIGS. 12A–12D, aberrations including the coma and astigmatism caused when the tracking operation is performed are sufficiently suppressed.

Figure 13:
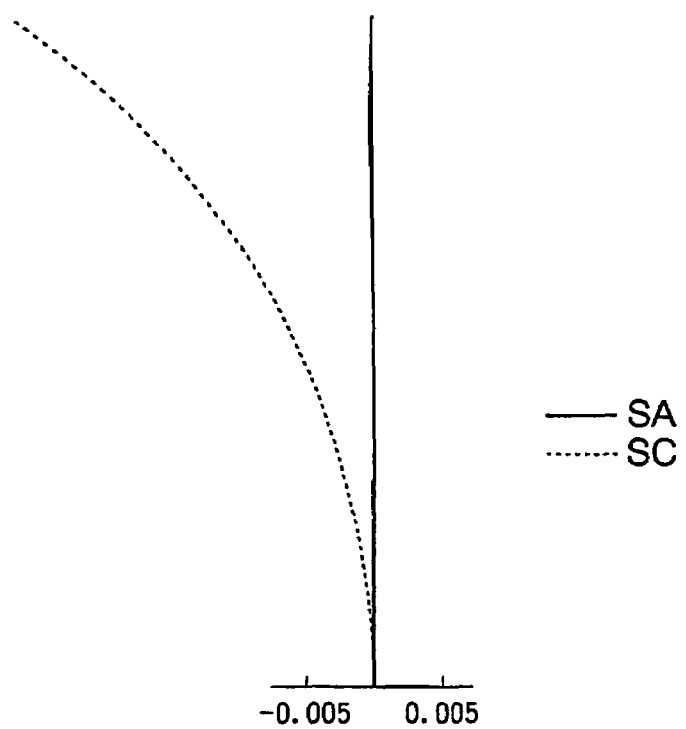
FIG. 13 is a graph showing spherical aberration and a sine condition caused with regard to the third example according to the second embodiment when an optical disc having thicker cover layer is used.

FIG. 13 is a graph showing spherical aberration and a sine condition caused when the optical disc 20B (e.g., CD) is used in the optical system 200A according to the third example. As shown in FIG. 13, the spherical aberration is sufficiently corrected.

Figure 14A:
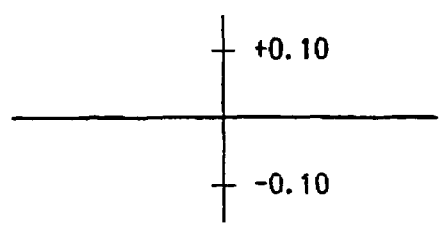
FIG. 14A is a graph of wavefront aberration which is caused in the third example in a meridional direction when the objective lens is situated at an initial position during the use of the optical disc having thicker cover layer.
Figure 14B:
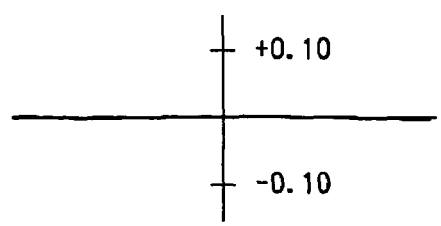
FIG. 14B is a graph of wavefront aberration which is caused in the third example in a sagittal direction when the objective lens is situated at the initial position during the use of the optical disc having thicker cover layer.
Figure 14C:
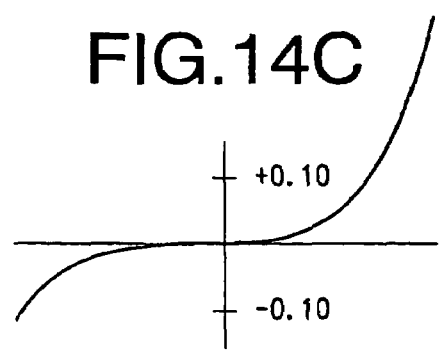
FIG. 14C is a graph of wavefront aberration which is caused in the third example in a meridional direction when the objective lens is shifted by tracking operation during the use the optical disc having thicker cover layer.
Figure 14D:
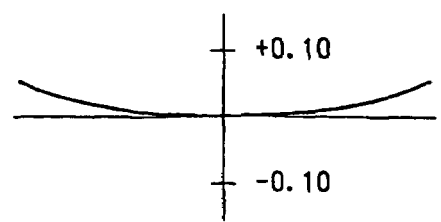
FIG. 14D is a graph of wavefront aberration which is caused in the third example in a sagittal direction when the objective lens is shifted by tracking operation during the use of the optical disc having thicker cover layer.

Each of FIGS. 14A, 14B, 14C and 14D is a graph illustrating wavefront aberration when the optical disc 20B is used in the third example. FIGS. 14A and 14C show wavefront aberration in a meridional direction. FIGS. 14B and 14D show wavefront aberration in a sagittal direction. Each of FIGS. 14A and 14B shows a case where the objective lens 212 is situated at the initial position (i.e., the objective lens 212 is located on the optical axis). Each of FIGS. 14C and 14D shows a case where the objective lens 212 is shifted from the optical axis by 0.4 mm by the tracking operation (in a direction corresponding to the Y direction shown in FIG. 2).

Figure 15:
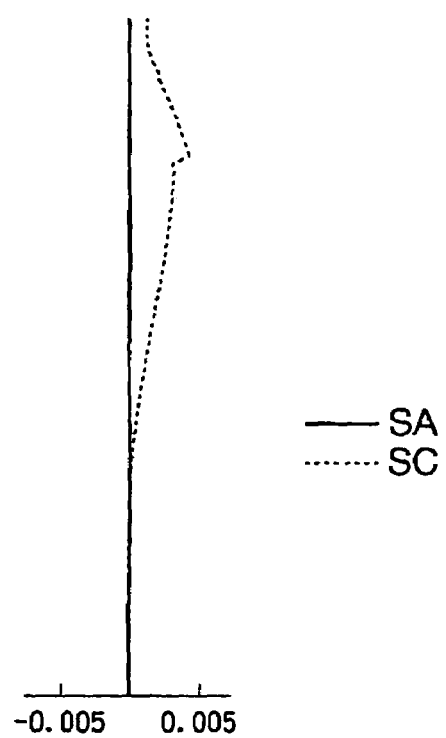
FIG. 15 is a graph showing spherical aberration and a sine condition caused with regard to a fourth example according to the second embodiment when an optical disc having thinner cover layer is used.

FIGS. 15, 16A–16D, 17, and 18A–18D are graphs illustrating the aberrations caused in the optical system 200A according to the fourth example. FIG. 15 is a graph showing spherical aberration and a sine condition caused when the optical disc 20A (e.g., DVD) is used in the optical system 200A according to the fourth example. As shown in FIG. 15, the spherical aberration is sufficiently corrected.

Figure 16A:
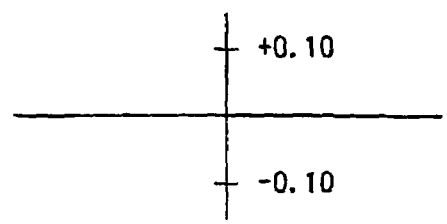
FIG. 16A is a graph of wavefront aberration which is caused in the fourth example in a meridional direction when the objective lens is situated at an initial position during the use of the optical disc having thinner cover layer.
Figure 16B:
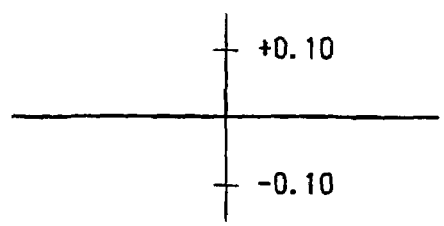
FIG. 16B is a graph of wavefront aberration which is caused in the fourth example in a sagittal direction when the objective lens is situated at the initial position during the use of the optical disc having thinner cover layer.
Figure 16C:
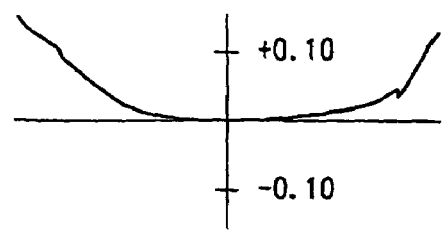
FIG. 16C is a graph of wavefront aberration which is caused in the fourth example in a meridional direction when the objective lens is shifted by tracking operation during the use the optical disc having thinner cover layer.
Figure 16D:
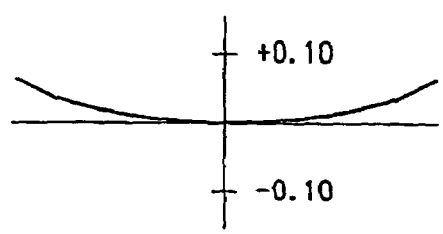
FIG. 16D is a graph of wavefront aberration which is caused in the fourth example in a sagittal direction when the objective lens is shifted by tracking operation during the use of the optical disc having thinner cover layer.

Each of FIGS. 16A, 16B, 16C and 16D is a graph illustrating wavefront aberration when the optical disc 20A is used in the fourth example. FIGS. 16A and 16C show wavefront aberration in a meridional direction. FIGS. 16B and 16D show wavefront aberration in a sagittal direction. Each of FIGS. 16A and 16B shows a case where the objective lens 212 is situated at the initial position (i.e., the objective lens 212 is located on the optical axis). Each of FIGS. 16C and 16D shows a case where the objective lens 212 is shifted from the optical axis by 0.4 mm by the tracking operation (in a direction corresponding to the Y direction shown in FIG. 2). As can be seen in FIGS. 16A–16D, aberrations including the coma and astigmatism caused when the tracking operation is performed are sufficiently suppressed.

Figure 17:
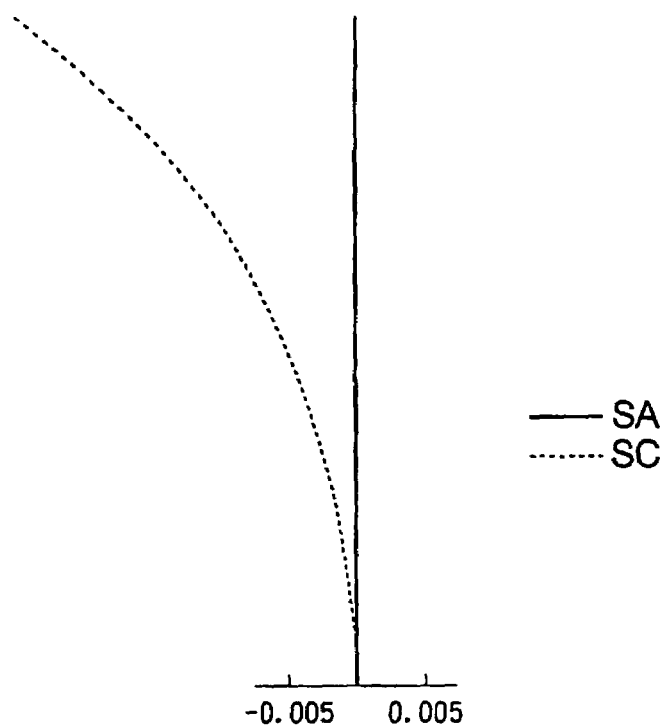
FIG. 17 is a graph showing spherical aberration and a sine condition caused with regard to the fourth example according to the second embodiment when an optical disc having thicker cover layer is used.

FIG. 17 is a graph showing spherical aberration and a sine condition caused when the optical disc 20B (e.g., CD) is used in the optical system 200A according to the fourth example. As shown in FIG. 17, the spherical aberration is sufficiently corrected.

Each of FIGS. 18A, 18B, 18C and 18D is a graph illustrating wavefront aberration when the optical disc 20B is used in the fourth example. FIGS. 18A and 18C show wavefront aberration in a meridional direction. FIGS. 18B and 18D show wavefront aberration in a sagittal direction. Each of FIGS. 18A and 18B shows a case where the objective lens 212 is situated at the initial position (i.e., the objective lens 212 is located on the optical axis). Each of FIGS. 18C and 18D shows a case where the objective lens 212 is shifted from the optical axis by 0.4 mm by the tracking operation (in a direction corresponding to the Y direction shown in FIG. 2).

Since each of the optical system 200 according to the second example and the optical systems 200A according to the third and fourth examples does not require the coupling lens, const reduction and downsizing of the optical system can be attained. Since the second, third and fourth examples satisfy the conditions (6)~(8), when the optical disc 20A is used, the aberrations including the coma and astigmatism caused by the tracking operation as well as the spherical aberration are effectively suppressed. Accordingly, the beam spot having the diameter suitable for the optical disc 20A can be formed on the data recording layer of the optical disc 20A when the optical disc 20A is used in each of the second, third and fourth examples.

With regard to the use of the optical disc 20B (e.g., CD) in the second, third and fourth examples, although the coma is caused in each of the second, third and fourth examples, such coma does not affect the recording operation and the reproducing operation for the optical disc 20B because as described above the tolerance to the aberrations for the optical disc 20B is larger than that in the case of the optical disc 20A (e.g., DVD).

Although the present invention has been described in considerable detail with reference to certain preferred embodiments thereof, other embodiments are possible.

The present disclosure relates to the subject matter contained in Japanese Patent Application No. P2003-160565, filed on Jun. 5, 2003, which is expressly incorporated herein by reference in its entirety.

What is claimed is:

1. An optical system of an optical pick-up, comprising:
a light source that emits a light beam; and
an objective lens that converges the light beam emitted by said light source onto a data recording layer of an optical disc,
wherein said optical system satisfies a condition:

$$0.75 < d \cdot (M-1)/(M \cdot L) < 1.0 \tag{1}$$

where d (mm) represents a thickness of said objective lens, M represents magnification of said optical system, and L (mm) represents an O/I distance which is defined as a distance between an object and an image,
wherein a beam spot suitable for the optical disc is formed by said objective lens on the data recording layer of the optical disc without using a coupling lens.

2. The optical system according to claim 1,
wherein when a numerical aperture NA of said objective lens on an optical disc side is larger than or equal to 0.55, said optical system satisfies a condition:

$$-0.0016 < M \cdot NA^2/L < -0.0007 \tag{2}$$

3. The optical system according to claim 1,
wherein the O/I distance L and the magnification M respectively satisfy conditions:

$$30 < L < 50 \tag{3}$$

$$-1/10 < M < -1/12.5 \tag{4}$$

4. The optical system according to claim 3,
wherein the O/I distance L satisfies a condition:

$$30 < L < 45 \tag{5}$$

5. An optical system of an optical pick-up used for recording data to and/or reproducing data from a plurality of types of optical discs having different thicknesses of cover layers, comprising:
a light source having a plurality of light emitting portions that respectively emit light beams having different wavelengths; and
an objective lens that converges each of the light beams emitted by the light emitting portions onto a data recording layer of corresponding one of the plurality of types of optical discs,
wherein said optical system satisfies a condition:

$$0.75 < d \cdot (M_i - 1)/(M_i \cdot L_i) < 1.0 \tag{6}$$

where d (mm) represents a thickness of said objective lens, $M_i$ represents magnification of said optical system, $L_i$ (mm) represents an O/I distance which is defined as a distance between an object and an image, and i (i is a natural number ranging from 1 to j; $j \geq 2$) represents a type of each of the plurality of types of the optical discs, given that i (i=1,2, . . . , j) respectively correspond to a $1^{st}$, $2^{nd}$, . . . , j-th ones of the plurality of types of the optical discs, the thicknesses of cover layers of the plurality of types of the optical discs satisfying a relationship $1^{st}$ disc < $2^{nd}$ disc < . . . < j-th disc,
wherein a beam spot suitable for each of the plurality of types of the optical discs is formed by said objective lens on the data recording layer of the corresponding one of the plurality of types of the optical discs without using a coupling lens.

6. The optical system according to claim 5,
wherein when a numerical aperture NA of said objective lens on an optical disc side is larger than or equal to 0.55, said optical system satisfies a condition:

$$-0.0016 < M_k \cdot NA_k^2/L_k < -0.0007 \tag{7}$$

where $M_k$, $NA_k$ and $L_k$ respectively represent the magnification, the numerical aperture and the O/I distance when a k-th ($1 \leq k \leq j$) optical disc having the numerical aperture larger then or equal to 0.55 is used.

7. The optical system according to claim 5,
wherein the O/I distance $L_i$ and the magnification $M_i$ respectively satisfy conditions:

$$30 < L_i < 50 \tag{8}$$

$$-1/10 < M_i < -1/12.5 \tag{9}$$

8. The optical system according to claim 7,
wherein the O/I distance $L_i$ satisfies a condition:

$$30 < L_i < 45 \qquad (10).$$

9. The optical system according to claim 8,
wherein the plurality of light emitting portions are aligned in a line which is perpendicular to a direction in which said objective lens is moved by a focusing operation and is perpendicular to a direction in which said objective lens is moved by a tracking operation.

10. The optical system according to claim 5,
wherein both of lens surfaces of said objective lens are aspherical surfaces,
wherein said objective lens has a diffracting structure on one of the lens surfaces, the diffracting structure having a function of forming a beam spot suitable for each of the plurality of types of optical discs.

\* \* \* \* \*